(12) United States Patent
Dykstra et al.

(10) Patent No.: US 10,323,499 B2
(45) Date of Patent: Jun. 18, 2019

(54) MANAGING WELLBORE OPERATIONS USING UNCERTAINTY CALCULATIONS

(71) Applicant: Halliburton Energy Services, Inc., Houston, TX (US)

(72) Inventors: Jason D. Dykstra, Carrollton, TX (US); Zhijie Sun, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 459 days.

(21) Appl. No.: 15/035,720

(22) PCT Filed: Dec. 6, 2013

(86) PCT No.: PCT/US2013/073670
§ 371 (c)(1),
(2) Date: May 10, 2016

(87) PCT Pub. No.: WO2015/084402
PCT Pub. Date: Jun. 11, 2015

(65) Prior Publication Data
US 2016/0281489 A1    Sep. 29, 2016

(51) Int. Cl.
| | | |
|---|---|---|
| G06G 7/48 | (2006.01) |
| E21B 44/00 | (2006.01) |
| E21B 44/02 | (2006.01) |
| E21B 47/024 | (2006.01) |
| E21B 7/04 | (2006.01) |
| G01V 99/00 | (2009.01) |

(Continued)

(52) U.S. Cl.
CPC .............. *E21B 44/00* (2013.01); *E21B 7/046* (2013.01); *E21B 44/02* (2013.01); *E21B 47/024* (2013.01); *G01V 99/005* (2013.01); *G05B 13/048* (2013.01); *E21B 3/00* (2013.01); *E21B 4/02* (2013.01); *E21B 10/54* (2013.01)

(58) Field of Classification Search
None
See application file for complete search history.

(56) References Cited

U.S. PATENT DOCUMENTS 5,901,795 A    5/1999   Tsao et al.
6,405,808 B1   6/2002   Edwards et al.
(Continued)

FOREIGN PATENT DOCUMENTS

CN        1910589 A      2/2007
EA        200200107 A1   8/2002

OTHER PUBLICATIONS

Odelson, Brian J., et al., "A New Autocovariance Least-Squares Method for Estimating Noise Covariances," Texas-Wisconsin Modeling and Control Consortium, Technical report No. 2003-04, Sep. 1, 2003, revised Aug. 18, 2004, re-revised Apr. 4, 2005, 13 pages.

(Continued)

*Primary Examiner* — Kibrom K Gebresilassie
*Assistant Examiner* — Cuong V Luu
(74) *Attorney, Agent, or Firm* — Alan Bryson; Parker Justiss, P.C.

(57) ABSTRACT

Techniques for controlling a bottom hole assembly (BHA) in a wellbore include determining a model of BHA dynamics; determining a predicted wellbore trajectory, based on the model of BHA dynamics; and determining an uncertainty of the predicted wellbore trajectory.

19 Claims, 11 Drawing Sheets

(51) Int. Cl.
    *G05B 13/04*     (2006.01)
    *E21B 3/00*     (2006.01)
    *E21B 4/02*     (2006.01)
    *E21B 10/54*     (2006.01)

(56) References Cited

U.S. PATENT DOCUMENTS

| | | | |
|---|---|---|---|
| 6,438,495 B1 | 8/2002 | Chau et al. | |
| 6,785,641 B1* | 8/2004 | Huang | E21B 10/00 |
| | | | 175/45 |
| 6,834,732 B2 | 12/2004 | Haarstad | |
| 7,003,439 B2 | 2/2006 | Aldred et al. | |
| 7,054,750 B2 | 5/2006 | Rodney et al. | |
| 8,010,290 B2 | 8/2011 | Illfelder | |
| 8,214,188 B2 | 7/2012 | Bailey et al. | |
| 8,442,769 B2 | 5/2013 | Phillips et al. | |
| 8,527,248 B2 | 9/2013 | Thambynayagam et al. | |
| 2005/0197777 A1 | 9/2005 | Rodney et al. | |
| 2008/0314641 A1* | 12/2008 | McClard | E21B 7/04 |
| | | | 175/57 |
| 2009/0000823 A1* | 1/2009 | Pirovolou | E21B 7/04 |
| | | | 175/61 |
| 2010/0185395 A1* | 7/2010 | Pirovolou | E21B 7/04 |
| | | | 702/9 |
| 2010/0191516 A1 | 7/2010 | Benish et al. | |
| 2010/0282508 A1* | 11/2010 | Johnston | E21B 7/04 |
| | | | 175/24 |
| 2010/0307742 A1* | 12/2010 | Phillips | E21B 47/022 |
| | | | 166/250.01 |
| 2011/0172976 A1 | 7/2011 | Budiman et al. | |
| 2012/0024606 A1 | 2/2012 | Pirovolou et al. | |
| 2012/0048618 A1* | 3/2012 | Zamanian | E21B 47/024 |
| | | | 175/24 |
| 2012/0316787 A1 | 12/2012 | Moran et al. | |
| 2012/0330551 A1* | 12/2012 | Mitchell | E21B 47/022 |
| | | | 702/9 |
| 2013/0140037 A1* | 6/2013 | Sequeira, Jr. | E21B 7/04 |
| | | | 166/369 |
| 2014/0231141 A1* | 8/2014 | Hay | E21B 44/00 |
| | | | 175/45 |
| 2015/0226049 A1* | 8/2015 | Frangos | E21B 44/00 |
| | | | 702/6 |
| 2017/0058658 A1* | 3/2017 | Spencer | G06F 17/5004 |
| 2017/0306702 A1* | 10/2017 | Summers | E21B 44/02 |

OTHER PUBLICATIONS

Odelson, Brian J., et al., "A new autocovariance least-squares method for estimating noise covariances," Automatica 42 (2006), pp. 303-308, 6 pages.

PCT International Search Report and Written Opinion of the International Searching Authority, PCT/US2013/073670, dated Sep. 4, 2014, 17 pages.

* cited by examiner

MANAGING WELLBORE OPERATIONS USING UNCERTAINTY CALCULATIONS

CROSS-REFERENCE TO RELATED APPLICATIONS

This application is a U.S. National Phase application under 35 U.S.C. § 371 and claims the benefit of priority to International Application Serial No. PCT/US2013/073670, filed on Dec. 6, 2013, the contents of which are hereby incorporated by reference.

TECHNICAL BACKGROUND

This disclosure relates to automated management of wellbore operation for the production of hydrocarbons from subsurface formations.

BACKGROUND

Drilling for hydrocarbons, such as oil and gas, typically involves the operation of drilling equipment at underground depths that can reach down to thousands of feet below the surface. Such remote distances of downhole drilling equipment, combined with unpredictable downhole operating conditions and vibrational drilling disturbances, creates numerous challenges in accurately controlling the trajectory of a wellbore. Compounding these problems is often the existence of neighboring wellbores, sometimes within close proximity of each other, that restricts the tolerance for drilling error. Drilling operations typically collect measurements from downhole sensors, located at or near a bottom hole assembly (BHA), to detect various conditions related to the drilling, such as position and angle of the wellbore trajectory, characteristics of the rock formation, pressure, temperature, acoustics, and/or radiation. Such sensor measurement data is typically transmitted to the surface, where human operators analyze the data to adjust the downhole drilling equipment. However, sensor measurements can be inaccurate, delayed, or infrequent, limiting the effectiveness of using such measurements. Often, a human operator is left to use best-guess estimates of the wellbore trajectory in controlling the drilling operation.

DETAILED DESCRIPTION

Figure 1:
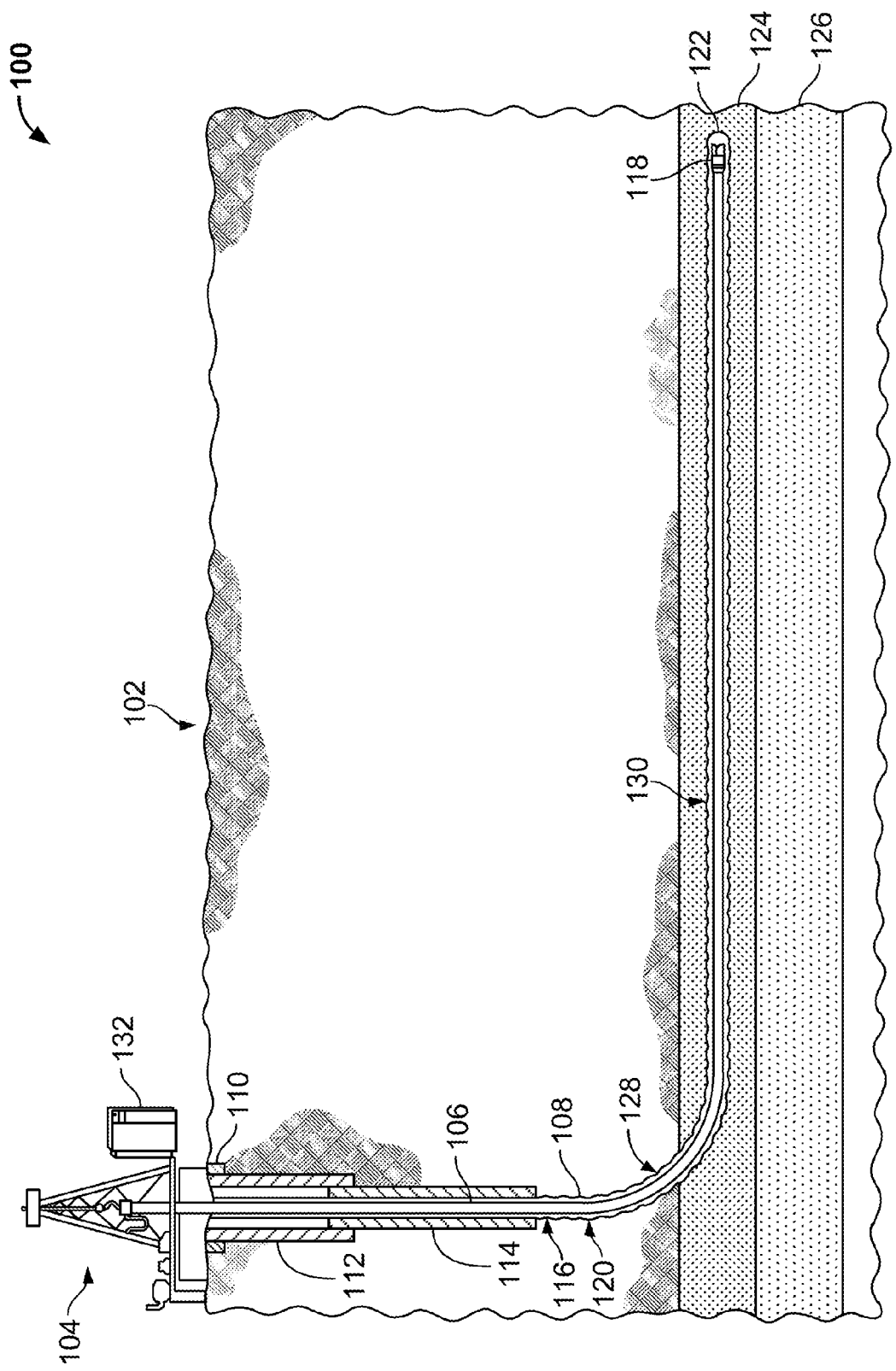
FIG. 1 illustrates an example of an implementation of at least a portion of a wellbore system in the context of a downhole operation.

This disclosure describes, generally, automated management and control of wellbore drilling operations by inferring an actual wellbore trajectory from measurements made by downhole sensors. In particular, this disclosure describes techniques that determine improved measures of uncertainty for a predicted wellbore trajectory. The measure of wellbore uncertainty may be derived from a model of BHA dynamics and estimates of noise variance. The improved measures of uncertainty may enable more accurate tracking of the true wellbore trajectory, and enable drilling with smaller margins of error. Different aspects of the drilling operation may be managed based on the improved calculations of wellbore uncertainty. For example, decision-making and control algorithms for taking high-fidelity measurements and adjusting an automated rate of penetration (ROP) control may be performed based on the calculated uncertainty.

In some examples, an improved measure of uncertainty may be used by a drilling system to determine appropriate times to take high-fidelity sensor measurements. In particular, if the wellbore uncertainty grows beyond a predetermined uncertainty bound, then a high-fidelity measurement may be taken to more precisely determine the wellbore trajectory. Additionally or alternatively, in some examples, based on the calculated wellbore uncertainty, control algorithms may be configured to automatically control downhole tools, such as the bottom hole assembly (BHA), such that drilling is performed in an efficient and cost-effective manner.

In a general implementation, a computer-implemented method of controlling a bottom hole assembly (BHA) in a wellbore includes determining a model of BHA dynamics; determining a predicted wellbore trajectory, based on the model of BHA dynamics; and determining an uncertainty of the predicted wellbore trajectory.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general implementations includes determining that the uncertainty of a predicted wellbore trajectory satisfies an uncertainty bound; determining that a sensor measurement should be taken, based on the uncertainty of a predicted wellbore trajectory satisfying the uncertainty bound; and implementing a control to take a high-fidelity measurement in the wellbore.

In a second aspect combinable with any of the previous aspects, determining an uncertainty of the predicted wellbore trajectory includes determining an estimated variance of noise for the model of BHA dynamics; determining variances of predicted azimuth measurements and predicted inclination measurements for the wellbore trajectory, based on the estimated variance of noise; and determining a weighted combination of the variances of predicted azimuth measurements and predicted inclination measurements for the wellbore trajectory.

In a third aspect combinable with any of the previous aspects, determining an uncertainty of the predicted wellbore trajectory further includes subtracting a variance of predicted sensor noise from the weighted combination of the variances of predicted azimuth measurements and predicted inclination measurements for the wellbore trajectory.

In a fourth aspect combinable with any of the previous aspects, determining an estimated variance of noise for the model of BHA dynamics includes determining an estimated variance of at least one of vibrational noise or sensor noise.

In a fifth aspect combinable with any of the previous aspects, determining an estimated variance of noise for the model of BHA dynamics includes performing an autocovariance least squares algorithm.

A sixth aspect combinable with any of the previous aspects further includes determining the uncertainty bound based on at least one of a planned wellbore trajectory, a plan of surrounding wellbores, or design capabilities of ROP control for the BHA.

In a seventh aspect combinable with any of the previous aspects, determining that a sensor measurement should be taken is further based on an economic cost of taking a sensor measurement and a rate of penetration (ROP) of the BHA.

In an eighth aspect combinable with any of the previous aspects, implementing a control to take a sensor measurement includes taking a high-fidelity measurement from at least one of an inclinometer or a magnetometer.

A ninth aspect combinable with any of the previous aspects further includes determining that a sensor measurement is available, and reducing the uncertainty of the predicted wellbore trajectory based on the sensor measurement.

A tenth aspect combinable with any of the previous aspects further includes updating the model of BHA dynamics, based on the sensor measurement.

An eleventh aspect combinable with any of the previous aspects further includes determining a control input for the BHA that reduces the uncertainty of the predicted wellbore trajectory; and drilling the wellbore according to the determined control input for the BHA.

A twelfth aspect combinable with any of the previous aspects further includes determining a level of measurement fidelity for the sensor measurement that should be taken, based on analyzing a tradeoff of costs associated with different levels of measurement fidelity and uncertainties of the predicted wellbore trajectory associated with the different levels of measurement fidelity.

A thirteenth aspect combinable with any of the previous aspects further includes determining a frequency of taking sensor measurements based on at least one of wellbore planning information, cost information, uncertainty of wellbore trajectory, or sensor measurements.

A fourteenth aspect combinable with any of the previous aspects further includes determining the uncertainty of the predicted wellbore trajectory by taking a weighted average of wellbore uncertainties in different geographic directions.

In a fifteenth aspect combinable with any of the previous aspects, determining a control input for the BHA includes determining at least one of a first bend angle control, a second bend angle control, a first packer control, or a second packer control.

In a sixteenth aspect combinable with any of the previous aspects, determining a control input for the BHA that reduces the uncertainty of the predicted wellbore trajectory includes determining a control input for the BHA that maximizes a rate of penetration (ROP) of the BHA subject to the uncertainty of the predicted wellbore trajectory satisfying the uncertainty bound.

In a seventeenth aspect combinable with any of the previous aspects, determining a model of BHA dynamics includes performing a linearization of a non-linear model of BHA dynamics, for an operating point of BHA operation.

In other general implementations, techniques (e.g., methods, systems, and apparatus) of controlling a bottom hole assembly (BHA) in a wellbore include determining a model of BHA dynamics; determining a predicted wellbore trajectory, based on the model of BHA dynamics; determining an uncertainty of the predicted wellbore trajectory; determining a control input for the BHA that reduces the uncertainty of the predicted wellbore trajectory; and drilling the wellbore according to the determined control input for the BHA.

In a first aspect combinable with any of the general implementations, determining a control input for the BHA includes determining at least one of a first bend angle control, a second bend angle control, a first packer control, or a second packer control.

In a second aspect combinable with any of the previous aspects, determining a control input for the BHA that reduces the uncertainty of the predicted wellbore trajectory includes determining a control input for the BHA that maximizes a rate of penetration (ROP) of the BHA subject to the uncertainty of the predicted wellbore trajectory satisfying an uncertainty bound.

In a third aspect combinable with any of the previous aspects, determining an uncertainty of the predicted wellbore trajectory includes determining an estimated variance of noise for the model of BHA dynamics; determining variances of predicted azimuth measurements and predicted inclination measurements for the wellbore trajectory, based on the estimated variance of noise; and determining a weighted combination of the variances of predicted azimuth measurements and predicted inclination measurements for the wellbore trajectory.

In a fourth aspect combinable with any of the previous aspects, determining an uncertainty of the predicted wellbore trajectory further includes subtracting a variance of predicted sensor noise from the weighted combination of the variances of predicted azimuth measurements and predicted inclination measurements for the wellbore trajectory.

In a fifth aspect combinable with any of the previous aspects, determining an estimated variance of noise for the model of BHA dynamics includes determining an estimated variance of at least one of vibrational noise or sensor noise.

In a sixth aspect combinable with any of the previous aspects, determining an estimated variance of noise for the model of BHA dynamics includes performing an autocovariance least squares algorithm.

A seventh aspect combinable with any of the previous aspects further includes determining that the uncertainty of a predicted wellbore trajectory satisfies an uncertainty bound; determining that a high-fidelity measurement should be taken, based on the uncertainty of a predicted wellbore trajectory satisfying the uncertainty bound; and implementing a control to take a high-fidelity measurement in the wellbore.

An eighth aspect combinable with any of the previous aspects further includes determining the uncertainty bound based on at least one of a planned wellbore trajectory, a plan of surrounding wellbores, or design capabilities of ROP control for the BHA.

In a ninth aspect combinable with any of the previous aspects, determining that a high-fidelity measurement should be taken is further based on an economic cost of taking a high-fidelity measurement and a ROP of the BHA.

In a tenth aspect combinable with any of the previous aspects, implementing a control to take a high-fidelity measurement includes taking a measurement from at least one of an inclinometer or a magnetometer.

An eleventh aspect combinable with any of the previous aspects further includes determining that a high-fidelity measurement is available, and reducing the uncertainty of the predicted wellbore trajectory based on the high-fidelity measurement.

A twelfth aspect combinable with any of the previous aspects further includes updating the model of BHA dynamics, based on the high-fidelity sensor measurement.

Various implementations of a control system for wellbore drilling according to the present disclosure may include none, one or some of the following features. For example, the system may improve the accuracy of inferring a true wellbore trajectory, based on sensor measurements. In particular, techniques described herein may provide improved measures of uncertainty for a predicted wellbore trajectory. The improved measures of wellbore uncertainty may, for example, enable a more accurate estimate of the risk of potential deviations from a planned trajectory. This may be used for a variety of purposes, such as improved anti-collision analysis in directional drilling.

The true wellbore trajectory may not be exactly known during drilling for various reasons, including unknown drilling conditions and vibrational disturbances that can move the drill bit away from the intended trajectory. In many scenarios, the longer that drilling is performed without taking high-accuracy measurements, the greater the uncertainty of the wellbore trajectory. Reducing the wellbore uncertainty typically requires taking more frequent measurements, to closely track the true wellbore trajectory. However, taking high-fidelity measurements often requires slowing down or stopping the drilling operation, which can increase the cost and delay of drilling.

Techniques described herein may provide a more accurate growth model of the wellbore uncertainty, which may enable closer tracking of the actual variance of the wellbore trajectory. The tighter estimates of wellbore uncertainty may reduce the need to take high-fidelity measurements and enable more efficient utilization of the BHA with fewer interruptions. In some examples, the improved model of wellbore uncertainty may reduce the costs and delays involved with taking high-fidelity measurements.

Techniques described herein may also be used to control the drilling ROP and to take high-fidelity measurements on-demand, based on the determined uncertainties of wellbore trajectory. This may be performed, for example, by feeding back a metric of total uncertainty to an ROP controller which regulates the drilling speed to keep the growth of uncertainty low while maintaining a large ROP. As the estimated uncertainty approaches a maximum tolerable uncertainty, a high-fidelity measurement (e.g., a survey) may be taken to track the true wellbore trajectory.

The measure of wellbore uncertainty may be derived from a model of BHA dynamics. The model of BHA dynamics may enable predicting a future wellbore trajectory, based on past measurement data and anticipated control inputs. The model of BHA dynamics may, in some examples, be updated dynamically as new measurements are taken and new control inputs are received, to closely track the true wellbore trajectory.

The details of one or more implementations are set forth in the accompanying drawings and the description below. Other features, objects, and advantages will be apparent from the description and drawings, and from the claims.

FIG. 1 illustrates a portion of one implementation of a deviated wellbore system 100 according to the present disclosure. Although shown as a deviated system (e.g., with a directional, horizontal, or radiussed wellbore), the system can include a relatively vertical wellbore only (e.g., including normal drilling variations) as well as other types of wellbores (e.g., laterals, pattern wellbores, and otherwise). Moreover, although shown on a terranean surface, the system 100 may be located in a sub-sea or water-based environment. Generally, the deviated wellbore system 100 accesses one or more subterranean formations, and provides easier and more efficient production of hydrocarbons located in such subterranean formations. Further, the deviated wellbore system 100 may allow for easier and more efficient hydraulic fracturing or stimulation operations. As illustrated in FIG. 1, the deviated wellbore system 100 includes a drilling assembly 104 deployed on a terranean surface 102. The drilling assembly 104 may be used to form a vertical wellbore portion 108 extending from the terranean surface 102 and through one or more geological formations in the Earth. One or more subterranean formations, such as productive formation 126, are located under the terranean surface 102. As will be explained in more detail below, one or more wellbore casings, such as a surface casing 112 and intermediate casing 114, may be installed in at least a portion of the vertical wellbore portion 108.

In some implementations, the drilling assembly 104 may be deployed on a body of water rather than the terranean surface 102. For instance, in some implementations, the terranean surface 102 may be an ocean, gulf, sea, or any other body of water under which hydrocarbon-bearing formations may be found. In short, reference to the terranean surface 102 includes both land and water surfaces and contemplates forming and/or developing one or more deviated wellbore systems 100 from either or both locations.

Generally, the drilling assembly 104 may be any appropriate assembly or drilling rig used to form wellbores or wellbores in the Earth. The drilling assembly 104 may use traditional techniques to form such wellbores, such as the vertical wellbore portion 108, or may use nontraditional or novel techniques. In some implementations, the drilling assembly 104 may use rotary drilling equipment to form such wellbores. Rotary drilling equipment is known and may consist of a drill string 106 and a bottom hole assembly (BHA) 118. In some implementations, the drilling assembly 104 may consist of a rotary drilling rig. Rotating equipment on such a rotary drilling rig may consist of components that serve to rotate a drill bit, which in turn forms a wellbore, such as the vertical wellbore portion 108, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 106. The drill string 106 is typically attached to the drill bit within the bottom hole assembly 118. A swivel, which is attached to hoisting equipment, carries much, if not all of, the weight of the drill string 106, but may allow it to rotate freely.

The drill string 106 typically consists of sections of heavy steel pipe, which are threaded so that they can interlock together. Below the drill pipe are one or more drill collars, which are heavier, thicker, and stronger than the drill pipe. The threaded drill collars help to add weight to the drill string 106 above the drill bit to ensure that there is enough downward pressure on the drill bit to allow the bit to drill through the one or more geological formations. The number and nature of the drill collars on any particular rotary rig may be altered depending on the downhole conditions experienced while drilling.

The drill bit is typically located within or attached to the bottom hole assembly 118, which is located at a downhole end of the drill string 106. The drill bit is primarily responsible for making contact with the material (e.g., rock) within the one or more geological formations and drilling through such material. According to the present disclosure, a drill bit type may be chosen depending on the type of geological formation encountered while drilling. For example, different geological formations encountered during drilling may require the use of different drill bits to achieve maximum drilling efficiency. Drill bits may be changed because of such differences in the formations or because the drill bits experience wear. Although such detail is not critical to the present disclosure, there are generally four types of drill bits, each suited for particular conditions. The four most common types of drill bits consist of: delayed or dragged bits, steel to rotary bits, polycrystalline diamond compact bits, and diamond bits. Regardless of the particular drill bits selected, continuous removal of the "cuttings" is essential to rotary drilling.

The circulating system of a rotary drilling operation, such as the drilling assembly 104, may be an additional component of the drilling assembly 104. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. Typically, the components of the circulating system include drilling fluid pumps, compressors, related plumbing fixtures, and specialty injectors for the addition of additives to the drilling fluid. In some implementations, such as, for example, during a horizontal or directional drilling process, downhole motors may be used in conjunction with or in the bottom hole assembly 118. Such a downhole motor may be a mud motor with a turbine arrangement, or a progressive cavity arrangement, such as a Moineau motor. These motors receive the drilling fluid through the drill string 106 and rotate to drive the drill bit or change directions in the drilling operation.

In many rotary drilling operations, the drilling fluid is pumped down the drill string 106 and out through ports or jets in the drill bit. The fluid then flows up toward the surface 102 within an annular space (e.g., an annulus) between the wellbore portion 108 and the drill string 106, carrying cuttings in suspension to the surface. The drilling fluid, much like the drill bit, may be chosen depending on the type of geological conditions found under subterranean surface 102. For example, certain geological conditions found and some subterranean formations may require that a liquid, such as water, be used as the drilling fluid. In such situations, in excess of 100,000 gallons of water may be required to complete a drilling operation. If water by itself is not suitable to carry the drill cuttings out of the bore hole or is not of sufficient density to control the pressures in the well, clay additives (bentonite) or polymer-based additives, may be added to the water to form drilling fluid (e.g., drilling mud) As noted above, there may be concerns regarding the use of such additives in underground formations which may be adjacent to or near subterranean formations holding fresh water.

In some implementations, the drilling assembly 104 and the bottom hole assembly 118 may operate with air or foam as the drilling fluid. For instance, in an air rotary drilling process, compressed air lifts the cuttings generated by the drill bit vertically upward through the annulus to the terranean surface 102. Large compressors may provide air that is then forced down the drill string 106 and eventually escapes through the small ports or jets in the drill bit. Cuttings removed to the terranean surface 102 are then collected.

As noted above, the choice of drilling fluid may depend on the type of geological formations encountered during the drilling operations. Further, this decision may be impacted by the type of drilling, such as vertical drilling, horizontal drilling, or directional drilling. In some cases, for example, certain geological formations may be more amenable to air drilling when drilled vertically as compared to drilled directionally or horizontally.

As illustrated in FIG. 1, the bottom hole assembly 118, including the drill bit, drills or creates the vertical wellbore portion 108, which extends from the terranean surface 102 towards the target subterranean formation 124 and the productive formation 126. In some implementations, the target subterranean formation 124 may be a geological formation amenable to air drilling. In addition, in some implementations, the productive formation 126 may be a geological formation that is less amenable to air drilling processes. As illustrated in FIG. 1, the productive formation 126 is directly adjacent to and under the target formation 124. Alternatively, in some implementations, there may be one or more intermediate subterranean formations (e.g., different rock or mineral formations) between the target subterranean formation 124 and the productive formation 126.

In some implementations of the deviated wellbore system 100, the vertical wellbore portion 108 may be cased with one or more casings. As illustrated, the vertical wellbore portion 108 includes a conductor casing 110, which extends from the terranean surface 102 shortly into the Earth. A portion of the vertical wellbore portion 108 enclosed by the conductor casing 110 may be a large diameter wellbore. For instance, this portion of the vertical wellbore portion 108 may be a 17½" wellbore with a 13⅜" conductor casing 110. Additionally, in some implementations, the vertical wellbore portion 108 may be offset from vertical (e.g., a slant wellbore). Even further, in some implementations, the vertical wellbore portion 108 may be a stepped wellbore, such that a portion is drilled vertically downward and then curved to a substantially horizontal wellbore portion. The substantially horizontal wellbore portion may then be turned downward to a second substantially vertical portion, which is then turned to a second substantially horizontal wellbore portion. Additional substantially vertical and horizontal wellbore portions may be added according to, for example, the type of terranean surface 102, the depth of one or more target subterranean formations, the depth of one or more productive subterranean formations, and/or other criteria.

Downhole of the conductor casing 110 may be the surface casing 112. The surface casing 112 may enclose a slightly smaller wellbore and protect the vertical wellbore portion 108 from intrusion of, for example, freshwater aquifers located near the terranean surface 102. The vertical wellbore portion 108 may than extend vertically downward toward a kickoff point 120, which may be between 500 and 1,000 feet above the target subterranean formation 124. This portion of the vertical wellbore portion 108 may be enclosed by the intermediate casing 114. The diameter of the vertical wellbore portion 108 at any point within its length, as well as the casing size of any of the aforementioned casings, may be an appropriate size depending on the drilling process.

Upon reaching the kickoff point 120, drilling tools such as logging and measurement equipment may be deployed into the wellbore portion 108. At that point, a determination of the exact location of the bottom hole assembly 118 may be made and transmitted to the terranean surface 102. Further, upon reaching the kickoff point 120, the bottom hole assembly 118 may be changed or adjusted such that appropriate directional drilling tools may be inserted into the vertical wellbore portion 108.

As illustrated in FIG. 1, a curved wellbore portion 128 and a horizontal wellbore portion 130 have been formed within one or more geological formations. Typically, the curved wellbore portion 128 may be drilled starting from the downhole end of the vertical wellbore portion 108 and deviated from the vertical wellbore portion 108 toward a predetermined azimuth gaining from between 9 and 18 degrees of angle per 100 feet drilled. Alternatively, different predetermined azimuth may be used to drill the curved wellbore portion 128. In drilling the curved wellbore portion 128, the bottom hole assembly 118 often uses measurement-while-drilling ("MWD") equipment to more precisely determine the location of the drill bit within the one or more geological formations, such as the target subterranean formation 124. Generally, MWD equipment may be utilized to directionally steer the drill bit as it forms the curved wellbore portion 128, as well as the horizontal wellbore portion 130.

Alternatively to or in addition to MWD data being compiled during drilling of the wellbore portions shown in FIG. 1, certain high-fidelity measurements (e.g., surveys) may be taken during the drilling of the wellbore portions. For example, surveys may be taken periodically in time (e.g., at particular time durations of drilling, periodically in wellbore length (e.g., at particular distances drilled, such as every 30 feet or otherwise), or as needed or desired (e.g., when there is a concern about the path of the wellbore). Typically, during a survey, a completed measurement of the inclination and azimuth of a location in a well (typically the total depth at the time of measurement) is made in order to know, with reasonable accuracy, that a correct or particular wellbore path is being followed (e.g., according to a wellbore plan). Further, position may be helpful to know in case a relief well must be drilled. High-fidelity measurements may include inclination from vertical and the azimuth (or compass heading) of the wellbore if the direction of the path is critical. These high-fidelity measurements may be made at discrete points in the well, and the approximate path of the wellbore computed from the discrete points. The high-fidelity measurements may be made with any suitable high-fidelity sensor. Examples include, for instance, simple pendulum-like devices to complex electronic accelerometers and gyroscopes. For example, in simple pendulum measurements, the position of a freely hanging pendulum relative to a measurement grid (attached to the housing of a measurement tool and assumed to represent the path of the wellbore) is captured on photographic film. The film is developed and examined when the tool is removed from the wellbore, either on wireline or the next time pipe is tripped out of the hole.

The horizontal wellbore portion 130 may typically extend for hundreds, if not thousands, of feet within the target subterranean formation 124. Although FIG. 1 illustrates the horizontal wellbore portion 130 as exactly perpendicular to the vertical wellbore portion 108, it is understood that directionally drilled wellbores, such as the horizontal wellbore portion 130, have some variation in their paths. Thus, the horizontal wellbore portion 130 may include a "zigzag" path yet remain in the target subterranean formation 124. Typically, the horizontal wellbore portion 130 is drilled to a predetermined end point 122, which, as noted above, may be up to thousands of feet from the kickoff point 120. As noted above, in some implementations, the curved wellbore portion 128 and the horizontal wellbore portion 130 may be formed utilizing an air drilling process that uses air or foam as the drilling fluid.

The wellbore system 100 also includes a controller 132 that is communicative with the BHA 118. The controller 132 may be located at the wellsite (e.g., at or near drilling assembly 104) or may be remote from the wellsite. The controller 132 may also be communicative with other systems, devices, databases, and networks. Generally, the controller 132 may include a processor based computer or computers (e.g., desktop, laptop, server, mobile device, cell phone, or otherwise) that includes memory (e.g., magnetic, optical, RAM/ROM, removable, remote or local), a network interface (e.g., software/hardware based interface), and one or more input/output peripherals (e.g., display devices, keyboard, mouse, touchscreen, and others).

The controller 132 may at least partially control, manage, and execute operations associated with the drilling operation of the BHA and/or high-fidelity sensor measurements. In some aspects, the controller 132 may control and adjust one or more of the illustrated components of wellbore system 100 dynamically, such as, in real-time during drilling operations at the wellbore system 100. The real-time control may be adjusted based on sensor measurement data or based on changing predictions of the wellbore trajectory, even without any sensor measurements.

The controller 132 may perform such control operations based on a model of BHA dynamics. The model of BHA dynamics may simulate various physical phenomena in the drilling operation, such as vibrational disturbances and sensor noise. The controller 132 may use the model of BHA dynamics to determine a predicted wellbore trajectory and determine a measure of uncertainty associated with the predicted wellbore trajectory.

A simple measure of uncertainty assumes that wellbore uncertainty is zero immediately after a survey is taken, and that the uncertainty grows linearly with drilling depth, until the next high-fidelity measurement (e.g., survey) is taken. While this simple measure of uncertainty may be fast to compute and easy to implement, it may be less accurate when the environment is different from that of testing conditions. Techniques described herein provide a dynamic model of the BHA, based on which a measure of uncertainty can be estimated and predicted for the present as well as for a future period of time.

In general, the model of BHA dynamics relies on an underlying state variable that evolves with time, representing changing conditions in the drilling operation. The state variable in the model of BHA dynamics is an estimate of the true state of the BHA, from which estimates of wellbore trajectory can be derived.

For example, a continuous-time state-space model of BHA dynamics may be formulated as:

$$\dot{x} = A_c x + B_c u$$

$$y = C_c x \tag{1}$$

where $A_c$, $B_c$ and $C_c$ are system matrices in a continuous-time domain. The state x represents successive states of the BHA system. Input u is the control signal, which may include first and second bend angles of the BHA, the depth of the BHA, inflation of first and second packers, and a separation of the packers. The output y is the trajectory of wellbore expressed by 12 measurements from the near and far inclination and magnetometer packages. The system of Equation 1 can be discretized with a sampling rate of 1/ΔT to yield an equivalent discrete-time state-space form:

$$x(k+1) = A_d x(k) + B_d u(k)$$

$$y(k) = C_d x(k) \tag{2}$$

where $A_d$, $B_d$ and $C_d$ are the discrete system matrices. Further, the model in Equation 2 can be modified to include noise that accounts for stochastic factors, such as effects of rock-bit interactions and vibrations, which leads to the following model:

$$x(k+1) = Ax(k) + Bu(k) + w(k)$$

$$y(k) = Cx(k) + v(k) \tag{3}$$

where w(k) and v(k) represent process noise and measurement noise, respectively. The noise variables w(k) and v(k) are typically modeled by Gaussian processes, but non-Gaussian noise can also be modeled by modifying the matrix A to include not only the dynamics described by $A_d$ but also the dynamics of stochastic noise, denoted by $A_s$:

$$A = \begin{bmatrix} A_d & 0 \\ 0 & A_s \end{bmatrix}$$

The system matrices A, B, and C are determined by the underlying physics and mechanisms employed in the drilling process. In practice, these matrices are estimated and modeled based on experience. In addition, the noise processes w(k) and v(k) are not exactly known, although reasonable guesses can be made for these processes, and these guesses can be modified based on experience.

Figure 2A:
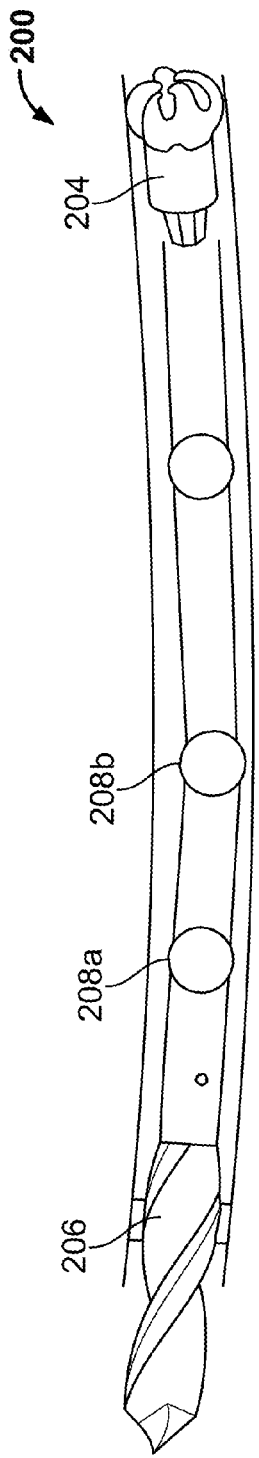
FIGS. 2A and 2B illustrate examples of a model of bottom-hole assembly (BHA) dynamics using a lumped-mass system.
Figure 2B:
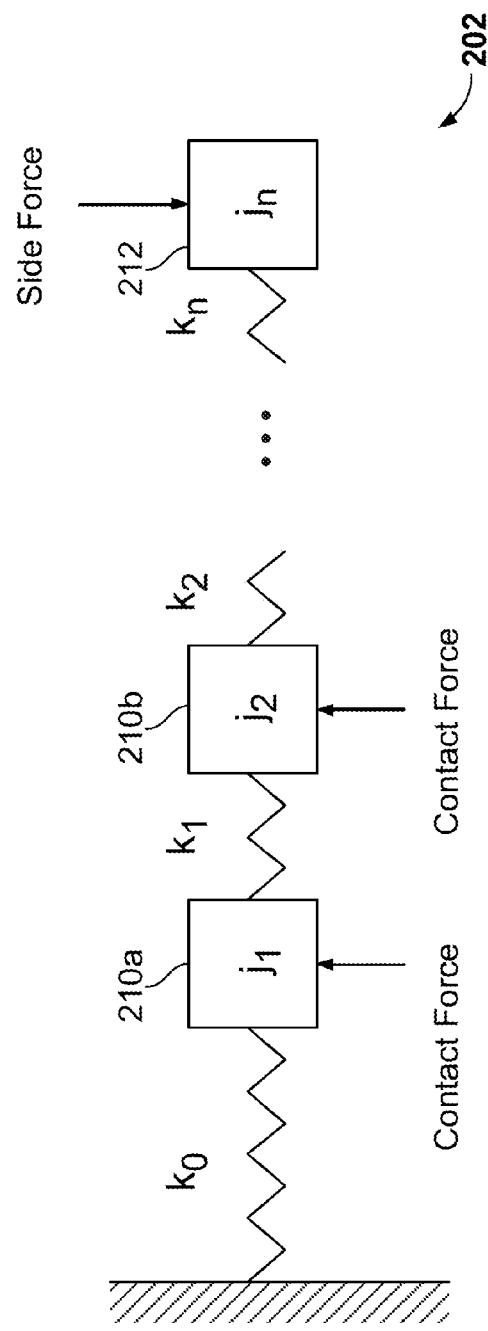

One example of modeling the system matrices A, B, and C is to use a lumped-mass system. FIGS. 2A and 2B illustrate examples of a model of dynamics for a bottom-hole assembly (BHA) system. In these examples, the BHA system is modeled by a lumped-mass system 200 shown in FIG. 2A, which is further abstracted by the spring-mass system 202 shown in FIG. 2A. In the example of FIG. 2A, the BHA 204 is considered rigidly connected to the wellbore through a stabilizer 206. Contact force is considered for each of the masses (e.g., masses 208a and 208b in FIG. 2A, represented by masses 210a and 210b in FIG. 2B). Force caused by rock-bit interactions is also considered in the mass 212, which represents the bit in this example. Since these various forces are unknown and random in nature, they are treated as random noise processes in the example model of BHA dynamics of Equation 3. For example, the model can be represented by the component $A_s$ in the A matrix, representing the noise dynamics.

Due to the random noise and potential inaccuracies in modeling the system matrices A, B, and C, the state x of the BHA system is, in general, not exactly known, but rather inferred. In these scenarios, Equation 3 may be used to determine inferences, or estimates, of the state x and measurements y, rather than their true values. More will be described with respect to these estimates below in connection with FIG. 3.

The model in Equation 3 may be updated dynamically as new information is received by the controller (e.g., the controller 132 in FIG. 1). For example, matrices A and B are affected by known control inputs (e.g., BHA control, trajectory, and other inputs.) in addition to being affected by any measurements (e.g., logging measurements, high-fidelity measurements, and other measurements.). Therefore, the model of BHA dynamics may be updated as the control inputs and/or drilling environment change.

Figure 3:
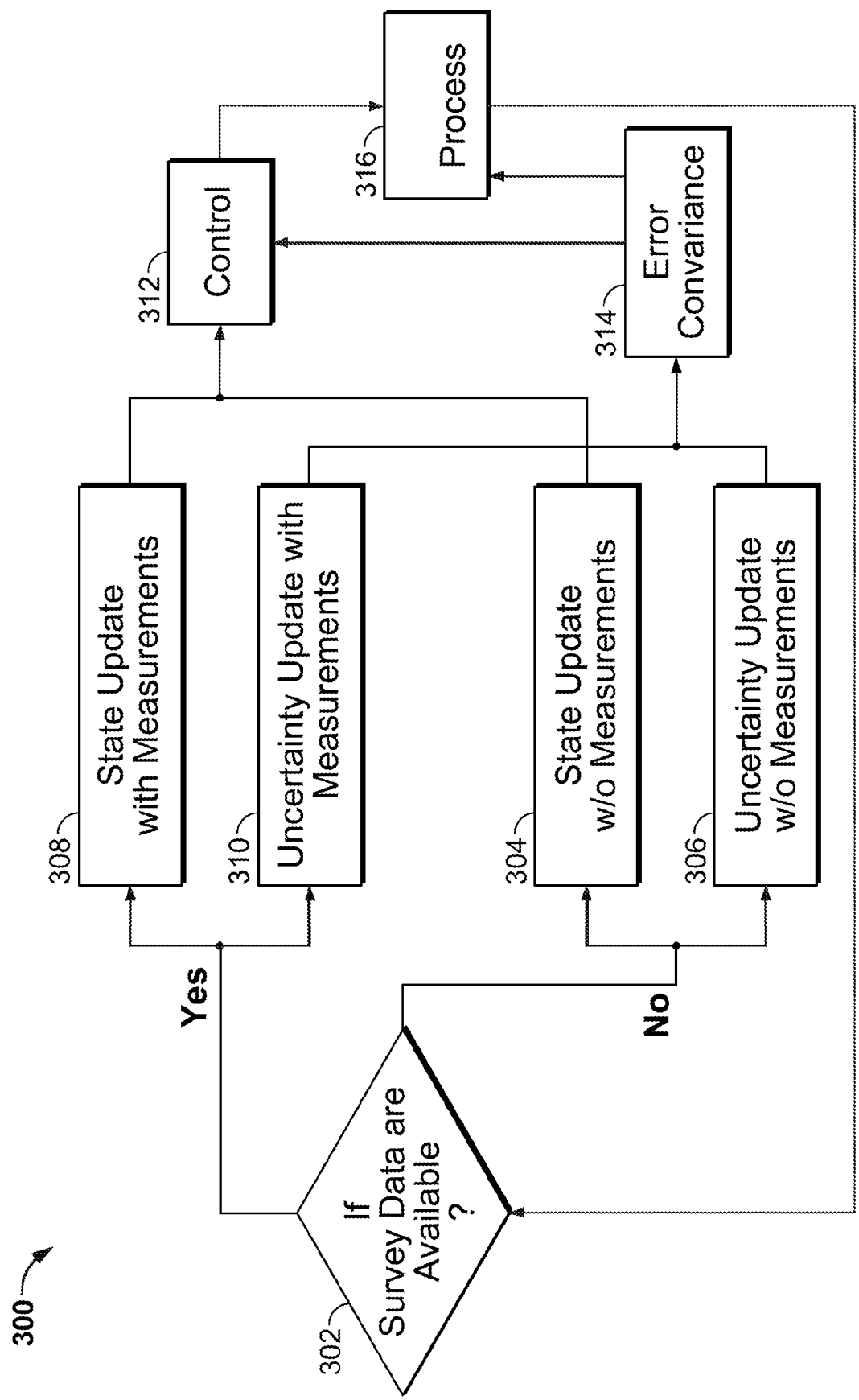
FIG. 3 illustrates an example of a processing flow of utilizing sensor measurements to update a model of BHA dynamics.

FIG. 3 illustrates an example of a processing flow of utilizing sensor measurements to update a model of BHA dynamics. Although sensor measurements may not always be available, when sensor measurements are taken, this information can change the model (matrices A, B) in unpredictable ways. The BHA controller may use such measurements to enable real-time updates to adjust the model. For example, if the measurements are high-fidelity measurements (e.g., surveys), then this may be considered to be a direct observation of the wellbore trajectory (e.g., the model's output y in Equation 3). The model of BHA dynamics may then be updated using known techniques (e.g., Kalman update equations) to incorporate such observations in obtaining an estimate of the next state of the system.

In the example of FIG. 3, at block 302, a determination is made whether a high-fidelity measurement (e.g., a survey) has been performed. If survey data is not available, then processing proceeds to blocks 304 and 306, where "blind" estimates of the next state of the system and the next measure of uncertainty are obtained. For example, the following equation may be used to obtain an estimate of the next state of the BHA system in block 304:

$$\hat{x}(k+1) = A\hat{x}(k) + Bu(k)$$

$$\hat{y}(k) = C\hat{x}(k) \tag{4}$$

A measure of the next uncertainty matrices may be determined in block 306 by using the following uncertainty update equations:

$$\Sigma_x(k+1) = A\Sigma_x(k)A^T + W$$

$$\Sigma_y(k) = C\Sigma_x(k)C^T + V \tag{5}$$

where $\Sigma_x(\cdot)$ is the uncertainty matrix for state estimates and is $\Sigma_y(\cdot)$ is the uncertainty matrix for outputs. The matrices W and V are covariance matrices for process noise w(k) and sensor measurement noise v(k), respectively. These covariance matrices W and V may be estimated using a variety of techniques, an example of which is discussed below.

If high-fidelity measurements are available in block 302, then processing proceeds to blocks 308 and 310, where the state estimates and wellbore uncertainty are updated using those measurements. For example, the state estimates may be updated in block 308 using Kalman filtering state update equations:

$$\hat{x}(k+1) = A\hat{x}(k) + Bu(k) + K[y(k) - \hat{y}(k)]$$

$$\hat{y}(k) = C\hat{x}(k) \tag{6}$$

In Equation 6, y(k) represents the actual observation provided by the high-fidelity sensor measurements. The factor K (e.g., a time-varying factor), also known as the Kalman observation gain, represents a correction factor to account for the error between the actual trajectory and the estimated trajectory, y(k)−ŷ(k). In general, a larger value of K implies that more weight is given to the measured observation y(k) in determining the estimate of the next state x̂(k+1). The value of K may be chosen according to any suitable criterion (e.g., minimize mean-squared error of state estimate, or any other suitable criterion), to achieve a desired tradeoff between relative importance of measured observations and underlying model dynamics.

The high-fidelity measurements may also be used to update the uncertainty matrices, in block 310, using Kalman filtering covariance update equations:

$$\Sigma_x(k+1) = A\Sigma_x(k)A^T + W - A\Sigma_x(k)C^T(C\Sigma_x(k)C^T+V)^{-1}C\Sigma_x(k)A^T$$

$$\Sigma_y(k) = C\Sigma_x(k)C^T + V \qquad (7)$$

By comparing Equation 6 with Equation 4, it can be seen that the state estimates can be corrected by high-fidelity measurement data when they are available. Similarly, comparison between Equation 7 and Equation 5 indicates that high-fidelity measurement data can effectively reduce the uncertainties of state estimates x and deviations y.

In some aspects, an "intermediate" technique may be available, which uses measurements from certain MWD devices (e.g., that take low-cost low-fidelity measurements). In such cases, the estimates can also be determined by Equation (6). In such cases, the uncertainty may grow faster than the high-fidelity measurements but slower than "blind" estimates (e.g., estimates without reference to such measurements). In some aspects, the system may determine the type of measurement to take based on analyzing a tradeoff between taking a low-cost, low-fidelity measurement versus a high-cost, high-fidelity measurement. As an example, the level of measurement fidelity (which may be a discretized or continuous variable) that is taken may be determined by minimizing a cost function that includes a cost of measurement (which generally increases with greater fidelity) and a cost of trajectory uncertainty (which generally decreases with greater fidelity). The terms in the cost function may be weighted, for example, to achieve a desired tradeoff between cost of measurements and uncertainty of wellbore trajectory. Switching between levels of measurement fidelity may be performed dynamically, based on real-time drilling conditions and objectives, or may be predetermined according to a fixed (or slowly varying) schedule, or may be based on achieving a relative steady-state frequency of each level of fidelity.

The updated state estimates (determined in block 304 or 308) may be used to determine the next control input (e.g., control u in Equation 3) to the BHA, in block 312. The control input may also be determined based on an error covariance (e.g., $\Sigma_y$), determined in block 314, which may be determined from the updates estimates of wellbore trajectory uncertainty (determined in block 306 or 310). The control may be determined according to any suitable criterion, as techniques described herein are not limited to a particular type of control. For example, the control may be designed such that the BHA operates in states that reduce the growth of wellbore trajectory uncertainty, as drilling proceeds without taking high-fidelity measurements.

Figure 4B:
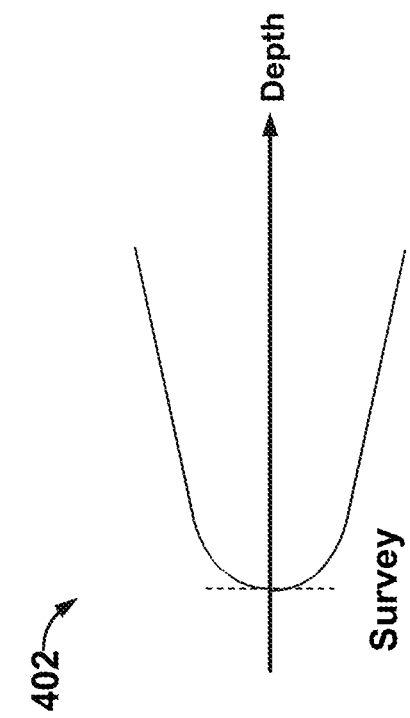
FIGS. 4A and 4B illustrate examples of growth of uncertainty for a predicted wellbore trajectory.
Figure 4A:
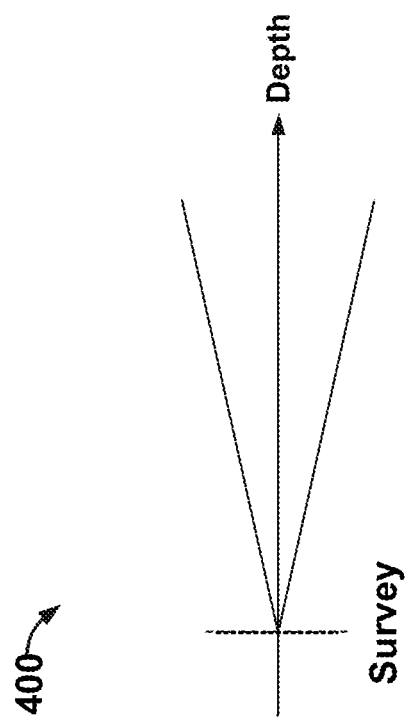

FIGS. 4A and 4B illustrate examples of growth of uncertainty of a predicted wellbore trajectory. FIG. 4A illustrates an example of growth of trajectory uncertainty 400 for a simple linear uncertainty model (where the uncertainty grows linearly as a function of drilling depth). FIG. 4B illustrates an example of growth of uncertainty 402 for a model of BHA dynamics according to Equations 6 and 7. The growth of wellbore uncertainty in Equation 7 is represented by the output uncertainty matrix $\Sigma_y(k)$, as a function of discrete time k. Ignoring the effects of bit walking (bit deflection), the BHA system represented by Equations 6 and 7 is stable, even without any control. In other words, all the eigenvalues of the system matrix A are within the unit circle except for one eigenvalue at 1 (or, equivalently, one pole at 0 in the continuous-time domain), which indicates an integrator. Therefore, as compared to the simple cone-type model of uncertainty growth in FIG. 4A, Equation 6 suggests that the growth of uncertainty is a bounded dynamics plus linear drift, as shown in FIG. 4B. Furthermore, after taking a high-fidelity measurement (e.g., a survey), the wellbore trajectory uncertainty will be reduced (but may not be exactly 0, due to sensor measurement noise).

As an alternative to the linear models in Equations 3-7, the BHA controller (e.g., controller 132 in FIG. 1) may use a nonlinear model of BHA dynamics. Using such models, linearization around operating points may be performed periodically to obtain different linear estimates of the nonlinear model at different points in time.

For example, the BHA system may be represented by the following nonlinear form:

$$x(k) = f(x(k-1), u(k-1)) + w(k-1)$$

$$y(k) = h(x(k)) + v(k) \qquad (8)$$

Using the extended Kalman filtering technique, the uncertainty matrices for state estimates and output estimates can be derived:

$$\Sigma_x(k+1) = A(k)\Sigma_x(k)A(k)^T + W(k) - A(k)\Sigma_x(k)C(k)^T(C(k)\Sigma_x(k)C(k)^T + V(k))^{-1}C(k)\Sigma_x(k)A(k)^T \text{ and}$$

$$\Sigma_y(k) = C(k)\Sigma_x(k)C(k)^T + V(k) \qquad (9)$$

Note that Equation 9 is the time-varying form of Equation 7, meaning that the A(k) and C(k) matrices are periodically linearized from the functions $f(x, u)$ and $h(x)$ at different points in time:

$$A(k) = \frac{\partial f}{\partial x}\bigg|_{\hat{x}(k-1), u(k-1)}$$

$$C(k) = \frac{\partial h}{\partial x}\bigg|_{\hat{x}(k-1)}$$

As such, the error propagation relationship in Equation 9 may be used to derive the uncertainty matrix of a wellbore trajectory even if the BHA system is nonlinear. In general, any suitable technique may be used to model nonlinearities in a BHA system, such as ensemble Kalman filter techniques.

The measures of wellbore uncertainty in Equation 9 may depend on estimates of noise variance W and V. Such estimates of noise variance may be derived by a number of techniques. For example, the autocovariance least-squares (ALS) may be used to obtain estimates of the covariance matrices W and V from closed-loop data, by defining the vector $x = [W^T \ V^T]^T$ and solving the equation $\hat{x} = A^{\dagger}\hat{b}$.

As long as control input data (bend angles of the BHA, depth, inflation and separation of the packers) and output data (sensor measurement data) are available, such techniques enable the estimation of variance of side force, based on these data. In addition or as an alternative, other models describing dynamics of stochastic effects may be used, by augmenting those models to Equations 3-7, and estimating the covariance of noises W and V.

Figure 5:
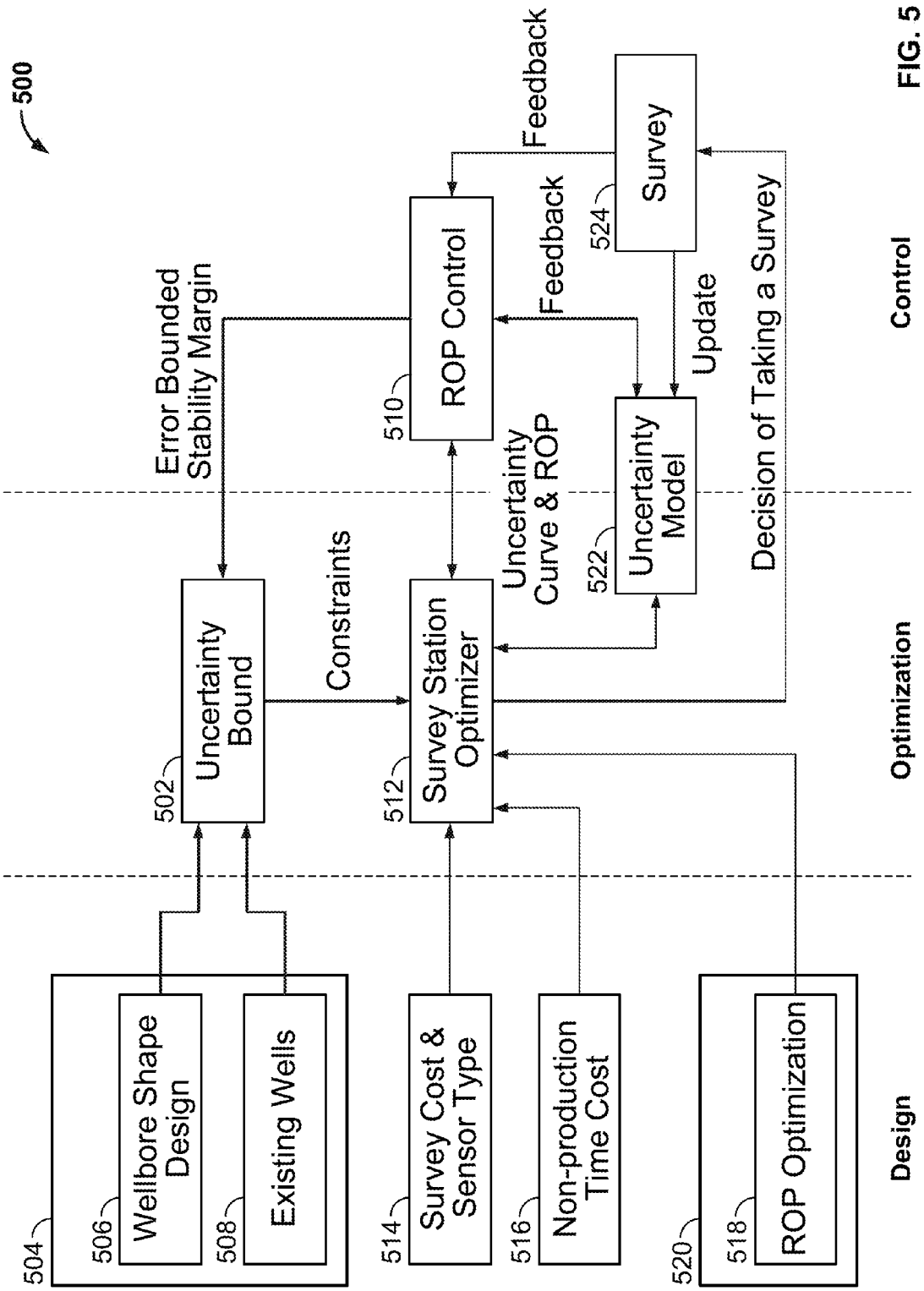
FIG. 5 is a flow diagram of an example process of wellbore operation control that utilizes one or more wellbore trajectory uncertainty models to control drilling operation and on-demand sensor measurements.

Techniques described herein to model wellbore uncertainty may also be applied to on-demand high-fidelity measurements. FIG. 5 is a flow diagram of an example process of wellbore operation control that utilizes one or more wellbore trajectory uncertainty models to control drilling and sensor measurements. Typically, high-fidelity measurements are taken only periodically, due to the delays and costs involved in operating high-fidelity sensors. For example, the rotation of drilling is typically stopped while surveys are taken, and such delays can contribute to the total non-production time. There may also be a cost associated with conducting a survey measurement, including non-production time cost. Therefore, it is often desirable to perform surveys only when necessary.

In some aspects, surveys may be taken every 30 feet of drilling. However, in some examples, it may be desirable to take high-fidelity measurements more frequently, to more accurately track the wellbore trajectory. For example, if there are other wellbores nearby, the increased risk of collisions may warrant taking survey measurements more frequently. In contrast, if other wellbores are far away, then it may be unnecessary to take survey measurements every 30 feet. Therefore, the frequency of taking high-fidelity measurements often depends on a tradeoff of various factors, including anti-collision and economic considerations.

In the example process of FIG. 5, the uncertainty bound is determined in block 502 by a directional well-planning module 504, based on the designed path information 506 and surrounding wellbore information 508, along with the capabilities of the ROP control 510. A survey station optimizer 512 is configured to balance the economic cost (e.g., survey cost information 514 and non-production time cost 516), uncertainty bound information 502, capabilities of the ROP control 510, any ROP optimization information 518 provided by a drilling efficiency module 520, and measures of predicted wellbore uncertainty 522.

In some examples, the decision by the survey station optimizer 512 may be made by taking a weighted average of wellbore uncertainties in different geographic directions, weighted by the relative importance of maintaining control of the wellbore in each direction. For example, the survey station optimizer may use the following "total uncertainty" criteria:

$$\text{Total uncertainty} = \sum_{i=1}^{12} WT_i \cdot \sum_y [i,i] \quad (10)$$

$$\text{Survey will} \begin{cases} \text{be taken,} & \text{if total uncertainty} > \sum_{max} \\ \text{not be taken,} & \text{if total uncertainty} < \sum_{max} \end{cases}.$$

The parameter $\Sigma_{max}$ is an uncertainty bound, or uncertainty limit, which is determined by a tradeoff between the design requirements and the costs associated with performing a survey measurement. In Equation 10, the term $\Sigma_y[i,i]$ is the i-th diagonal element of the error covariance matrix $\Sigma_y$ (e.g., the error variance of i-th measurement). $WT_i$ is a weighting factor for uncertainty in a particular geographic direction (e.g., in the x, y or z directions). The weighting factor depends on design specifications and collision avoidance requirements. For example, when drilling horizontally, if there is another well right above the current position, then a large weight on the z direction may be used to reduce the risk of collision with the neighboring well. In some examples, that sensor measurement noise may be subtracted from the total uncertainty in Equation 10 (since the actual position of wellbore is not affected by sensor noise):

$$\text{Total uncertainty} = \sum_{i=1}^{12} WT_i \cdot (\Sigma_y[i,i] - V[i,i])$$

where $V[i,i]$ is the i-th diagonal element of measurement noise matrix V.

In some examples, an ROP controller (e.g., ROP controller 510 in FIG. 5) on the surface may regulate the drilling speed according to a determination made by the survey station optimizer (e.g., survey station optimizer 512 in FIG. 5). For example, the control of ROP may be configured operate the rig in a range that avoids fast growth of uncertainty while maximizing the ROP. In some examples, the ROP control 510 may follow the uncertainty growth curve determined by the survey station optimizer 512. Also, the uncertainty model 522 may feed the actual uncertainty matrix back to the survey station optimizer 512 for optimization during the next control time interval.

Figure 6:
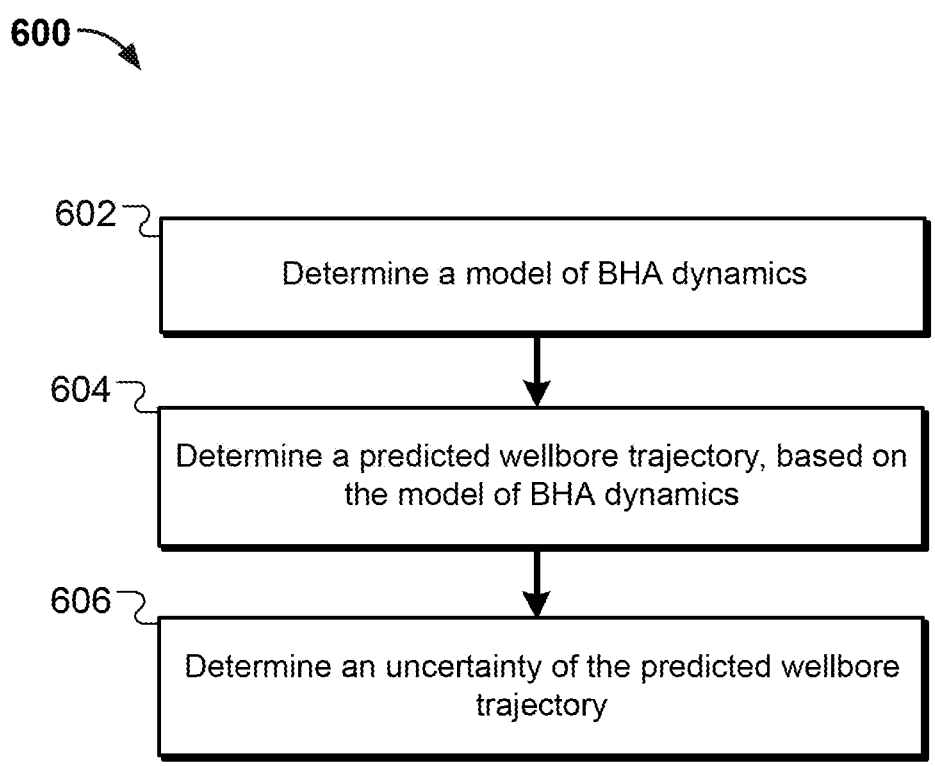
FIG. 6 is a flow chart of an example process 600 of model-based predictive control of a BHA using an uncertainty of a predicted wellbore trajectory.

FIG. 6 is a flow chart of an example process 600 of model-based predictive control of a BHA using an uncertainty of a predicted wellbore trajectory. One or more steps of the example process of FIG. 6 may be performed by a wellbore controller (e.g., controller 132 in FIG. 1). In this example, the controller determines a model of BHA dynamics (602). This model may be, for example, a state-space model of the BHA. The controller then determines a predicted wellbore trajectory, based on the model of BHA dynamics (604). The controller then determines an uncertainty of the predicted wellbore trajectory (606).

Figure 7:
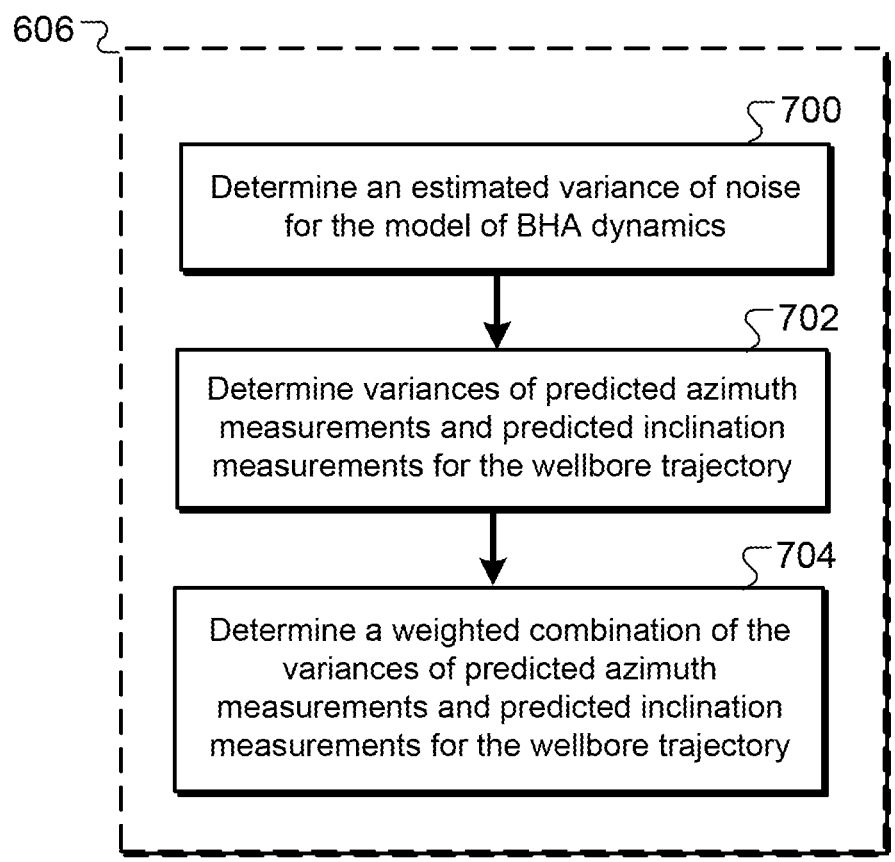
FIG. 7 is a flow chart of an example process of determining an uncertainty of a predicted wellbore trajectory.

FIG. 7 is a flow chart of an example of further details of determining an uncertainty of a predicted wellbore trajectory (e.g., step 606 in FIG. 6). In this example, the controller determines an estimated variance of noise for the model of BHA dynamics (700). The controller then determines variances of predicted azimuth measurements and predicted inclination measurements for the wellbore trajectory (702). The controller then determines a weighted combination of the variances of predicted azimuth measurements and predicted inclination measurements for the wellbore trajectory (704).

Figure 8A:
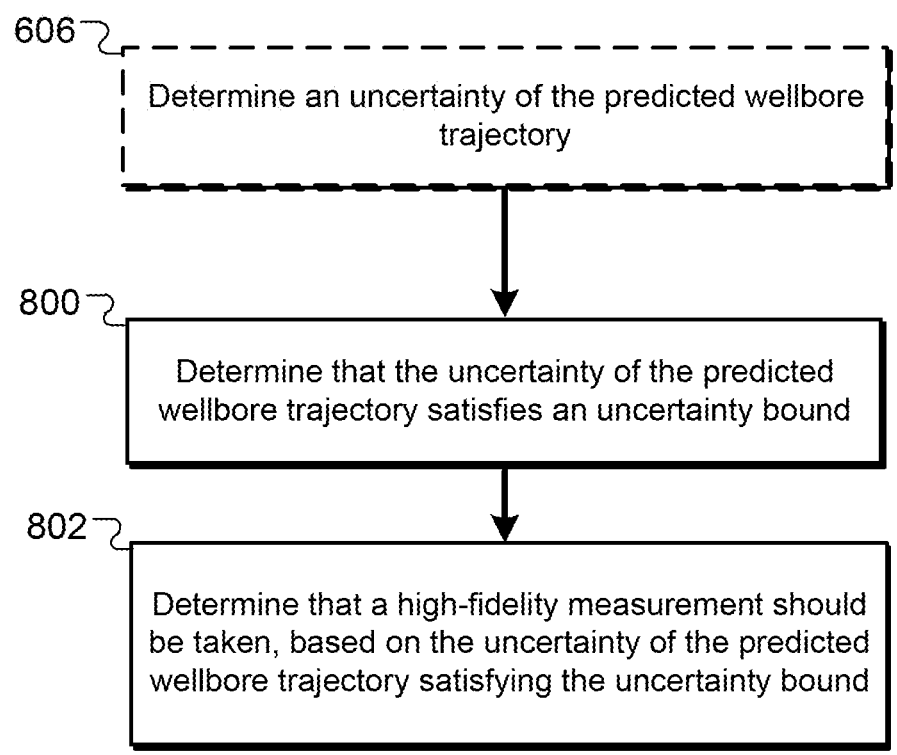
FIG. 8A is a flow chart of an example process of performing survey-on-demand control that utilizes one or more wellbore trajectory uncertainty models to determine whether to perform a survey measurement.

FIG. 8A is a flow chart of an example process of performing survey-on-demand control that utilizes one or more wellbore trajectory uncertainty models to determine whether to perform a sensor measurement (e.g., a high-fidelity survey measurement, or a lower-fidelity sensor measurement). The steps of this process may be performed, for example, after determining an uncertainty of a predicted wellbore trajectory (e.g., 606 in FIG. 6). One or more steps of the process in FIG. 8A may be performed, for example, by a BHA controller (e.g., controller 132 in FIG. 1) In this example, the controller determines that the uncertainty of the predicted wellbore trajectory satisfies an uncertainty bound (800). The controller then determines that a sensor measurement (e.g., a high-fidelity sensor measurement or a lower-fidelity sensor measurement) should be taken, based on the uncertainty of the predicted wellbore trajectory satisfying the uncertainty bound (802).

Figure 8B:
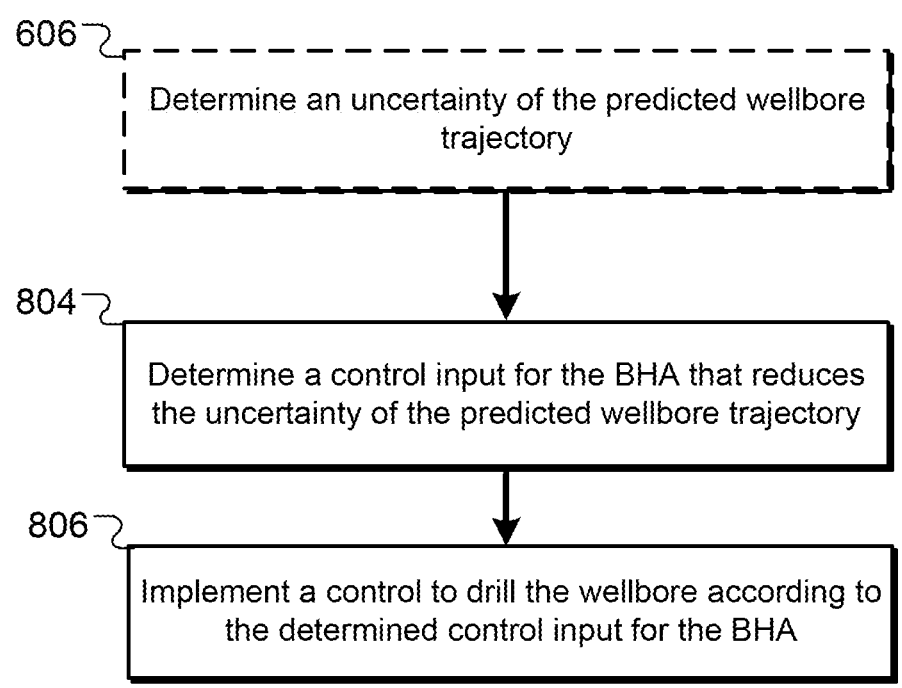
FIG. 8B is a flow chart of an example process of controlling a BHA based on one or more wellbore trajectory uncertainty models.

FIG. 8B is a flow chart of an example process of controlling a BHA based on one or more wellbore trajectory uncertainty models. The steps of this process may be performed, for example, after determining an uncertainty of a predicted wellbore trajectory (e.g., 606 in FIG. 6). One or more steps of the process in FIG. 8B may be performed, for example, by a BHA controller (e.g., controller 132 in FIG. 1) In this example, the controller determines a control input for the BHA that reduces the uncertainty of the predicted wellbore trajectory (804). The controller then implements a control to drill the wellbore according to the determined control input for the BHA (806).

Figure 9:
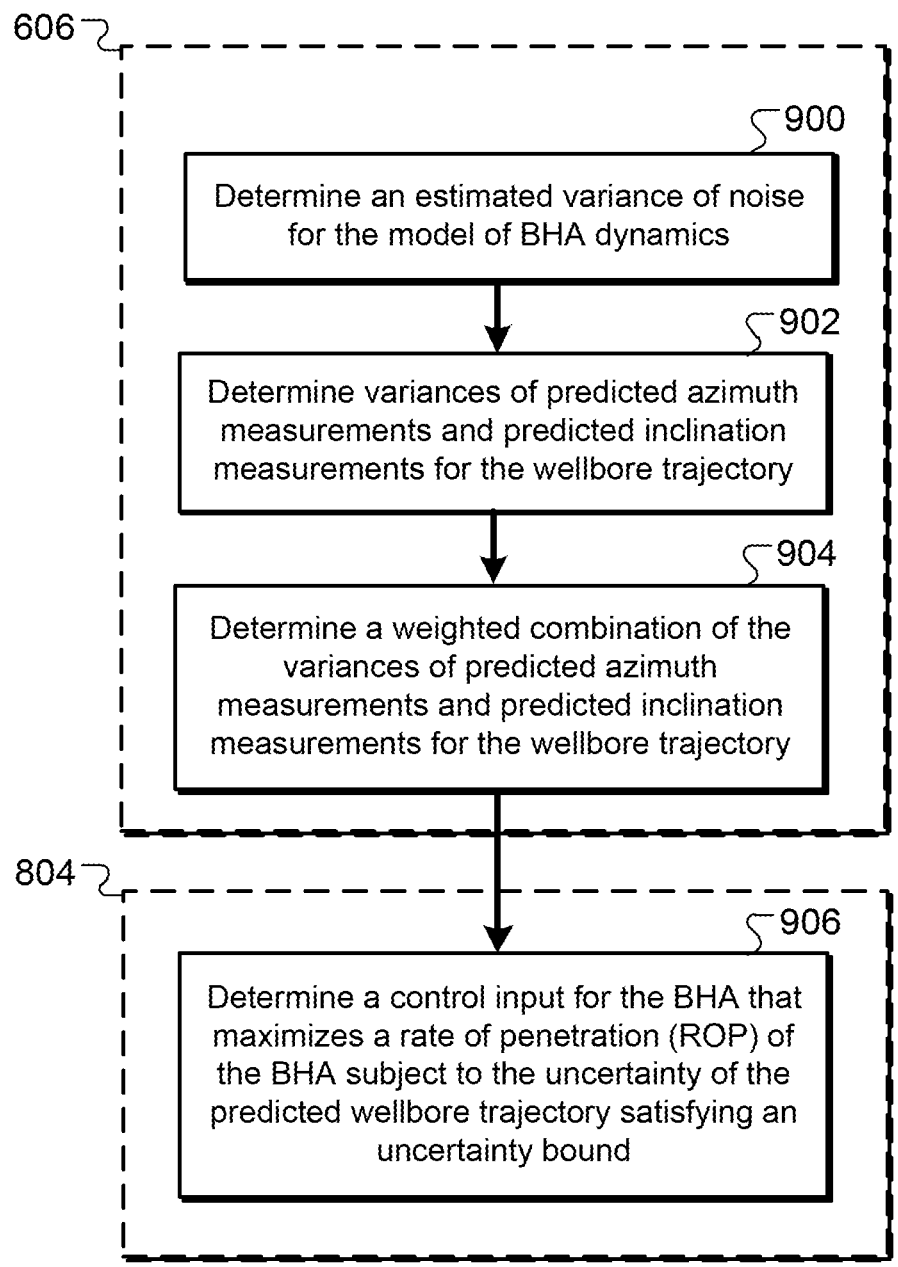
FIG. 9 is a flow chart of an example process of determining an uncertainty of a predicted wellbore trajectory and determining a control input for the BHA.

FIG. 9 is a flow chart of an example of further details of determining an uncertainty of a predicted wellbore trajectory (e.g., step 606 in FIG. 6), and determining a control input for the BHA that reduces the uncertainty of the predicted wellbore trajectory (e.g., step 804 in FIG. 8B). In this example, the controller determines an estimated variance of noise for the model of BHA dynamics (900). The controller then determines variances of predicted azimuth measurements and predicted inclination measurements for the wellbore trajectory (902). The controller then determines a weighted combination of the variances of predicted azimuth measurements and predicted inclination measurements for the wellbore trajectory (904). The controller then determines a control input for the BHA that maximizes a rate of penetration (ROP) of the BHA subject to the uncertainty of the predicted wellbore trajectory satisfying an uncertainty bound (906).

Figure 10:
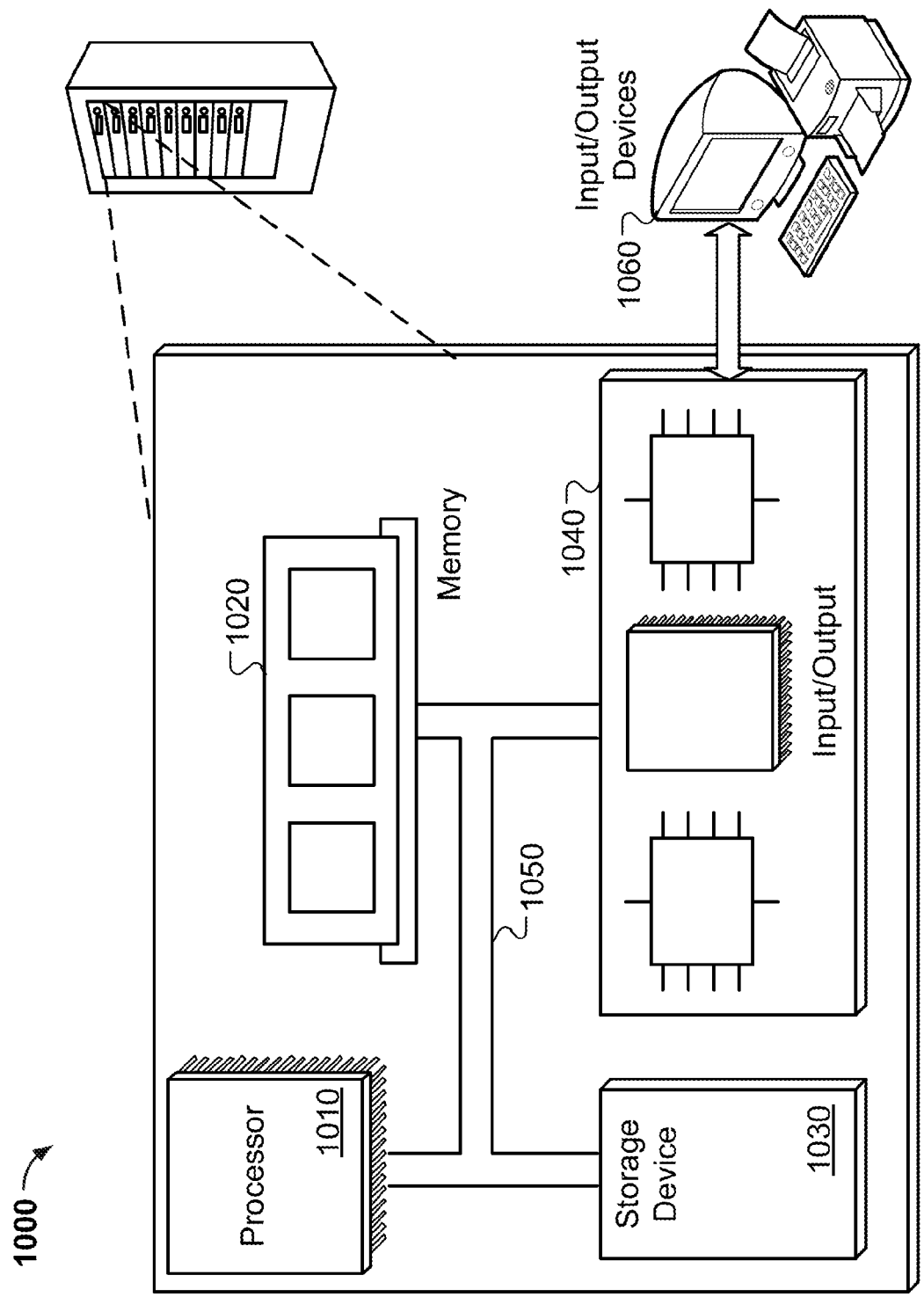
FIG. 10 is a block diagram of an example of a computer system on which some examples may operate.

FIG. 10 is a block diagram of an example of a computer system 1000. For example, referring to FIG. 1, one or more parts of the controller 132 or the BHA 118 could be an example of the system 1000 described here, such as a computer system used by any of the users who access resources of the wellbore system 100. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In some implementations, the processor 1010 is a single-threaded processor. In some implementations, the processor 1010 is a multi-threaded processor. In some implementations, the processor 1010 is a quantum computer. The processor 1010 is capable of processing instructions stored in the memory 1020 or on the storage device 1030. The processor 1010 may execute operations such as determining a model of BHA dynamics, determining an uncertainty of a wellbore trajectory, determining predictions of wellbore trajectory, determining control inputs that satisfy an objective function, and applying the control inputs to the BHA (e.g., FIGS. 6-9).

The memory 1020 stores information within the system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a computer-readable medium. In various different implementations, the storage device 1030 can include, for example, a hard disk device, an optical disk device, a solid-date drive, a flash drive, magnetic tape, or some other large capacity storage device. In some implementations, the storage device 1030 may be a cloud storage device, e.g., a logical storage device including multiple physical storage devices distributed on a network and accessed using a network. In some examples, the storage device may store long-term data, such as rock formation data or ROP design capabilities. The input/output device 1040 provides input/output operations for the system 1000. In some implementations, the input/output device 1040 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 1000 to communicate, for example, transmit and receive instructions to and from the controller 132 or the BHA 118 in FIG. 1. In some implementations, the input/output device can include driver devices configured to receive input data and send output data to other input/output devices, e.g., keyboard, printer and display devices 1060. In some implementations, mobile computing devices, mobile communication devices, and other devices can be used.

A server (e.g., a server forming a portion of the controller 132 or the wellbore system 100 shown in FIG. 1) can be realized by instructions that upon execution cause one or more processing devices to carry out the processes and functions described above, for example, such as calculating noise variances, determining measures of uncertainty, determining a control input to the BHA, and other operations and processes. (e.g., FIGS. 6-9). Such instructions can include, for example, interpreted instructions such as script instructions, or executable code, or other instructions stored in a computer readable medium. Different components of a wellbore system 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made. For example, additional aspects of processes 600 and 800 may include more steps or fewer steps than those illustrated in FIGS. 6-9. Further, the steps illustrated in FIGS. 6-9 may be performed in different successions than that shown in the figures. Moreover, although the concepts have been described in the context of a wellbore drilling system, the concepts could be applied to other processes as well. For example, in connection with medical endoscopic examination or other applications where an instrument is inserted and controlled inside of an unknown environment. Accordingly, other implementations are within the scope of the following claims.

What is claimed is:

1. A computer-implemented method for controlling a bottom hole assembly (BHA) in a wellbore, the method comprising:
    determining a model of BHA dynamics;
    determining, based on the model of BHA dynamics, a predicted wellbore trajectory;
    determining an uncertainty of the predicted wellbore trajectory, comprising:
        determining an estimated variance of noise for the model of BHA dynamics;
        determining variances of predicted azimuth measurements and predicted inclination measurements for the wellbore trajectory, based on the estimated variance of noise; and
        determining a weighted combination of the variances of predicted azimuth measurements and predicted inclination measurements for the wellbore trajectory;
    determining a control input for the BHA that reduces the uncertainty of the predicted wellbore trajectory; and
    drilling the wellbore according to the determined control input for the BHA.

2. The computer-implemented method of claim 1, wherein determining an uncertainty of the predicted wellbore trajectory further comprises:
    subtracting a variance of predicted sensor noise from the weighted combination of the variances of predicted azimuth measurements and predicted inclination measurements for the wellbore trajectory.

3. The computer-implemented method of claim 1, wherein determining an estimated variance of noise for the model of BHA dynamics comprises determining an estimated variance of at least one of vibrational noise or sensor noise.

4. The computer-implemented method of claim 1, wherein determining an estimated variance of noise for the model of BHA dynamics comprises performing an autocovariance least squares algorithm.

5. The computer-implemented method of claim 1, further comprising:
    determining that the uncertainty of the predicted wellbore trajectory satisfies an uncertainty bound;
    determining that a sensor measurement should be taken when the uncertainty of the predicted wellbore trajectory exceeds the uncertainty bound.

6. The computer-implemented method of claim 5, further comprising determining the uncertainty bound based on at least one of a planned wellbore trajectory, a plan of surrounding wellbores, or design capabilities of ROP control for the BHA.

7. The computer-implemented method of claim 5, wherein determining that a sensor measurement should be taken is further based on an economic cost of taking a sensor measurement and a rate of penetration (ROP) of the BHA.

8. The computer-implemented method of claim 5, further comprising implementing a control to take the sensor measurement in the wellbore.

9. The computer-implemented method of claim 8, wherein implementing a control to take a sensor measurement comprises taking a high-fidelity measurement from at least one of an inclinometer or a magnetometer.

10. The computer-implemented method of claim 5, further comprising determining that a sensor measurement is available, and reducing the uncertainty of the predicted wellbore trajectory based on the sensor measurement.

11. The computer-implemented method of claim 10, further comprising updating the model of BHA dynamics, based on the sensor measurement.

12. The computer-implemented method of claim 5, further comprising determining a level of measurement fidelity for the sensor measurement that should be taken, based on analyzing a tradeoff of costs associated with different levels of measurement fidelity and uncertainties of the predicted wellbore trajectory associated with the different levels of measurement fidelity.

13. The computer-implemented method of claim 5, further comprising determining a frequency of taking sensor measurements based on at least one of wellbore planning information, cost information, uncertainty of wellbore trajectory, or sensor measurements.

14. The computer-implemented method of claim 5, further comprising determining the uncertainty of the predicted wellbore trajectory by taking a weighted average of wellbore uncertainties in different geographic directions.

15. The computer-implemented method of claim 1, wherein determining a control input for the BHA comprises determining at least one of a first bend angle control, a second bend angle control, a first packer control, or a second packer control.

16. The computer-implemented method of claim 1, wherein determining a control input for the BHA that reduces the uncertainty of the predicted wellbore trajectory comprises determining a control input for the BHA that maximizes a rate of penetration (ROP) of the BHA subject to the uncertainty of the predicted wellbore trajectory being within an uncertainty bound.

17. The computer-implemented method of claim 1, wherein determining a model of BHA dynamics comprises performing a linearization of a non-linear model of BHA dynamics, for an operating point of BHA operation.

18. A system comprising:
   a bottom hole assembly (BHA) at least partially disposed within a wellbore at or near a subterranean zone, the BHA associated with at least one sensor; and
   a controller communicably coupled to the BHA, the controller operable to:
      determine a model of BHA dynamics;
      determine a predicted wellbore trajectory, based on the model of BHA dynamics;
      determine an uncertainty of the predicted wellbore trajectory, comprising:
         determining an estimated variance of noise for the model of BHA dynamics;
         determining variances of predicted azimuth measurements and predicted inclination measurements for the wellbore trajectory, based on the estimates of noise; and
         determining a weighted combination of the variance of the predicted azimuth measurements and predicted inclination measurements for the wellbore trajectory;
      determine a control input for the BHA that reduces the uncertainty of the predicted wellbore trajectory; and
      drilling the wellbore according to the determined control input for the BHA.

19. A non-transitory computer-readable storage medium encoded with at least one computer program comprising instructions that, when executed, operate to cause at least one processor to perform operations for controlling a bottom hole assembly (BHA) in a wellbore, the operations comprising:
   determining a model of BHA dynamics;
   determining a predicted wellbore trajectory, based on the model of BHA dynamics;
   determining an uncertainty of the predicted wellbore trajectory, comprising:
      determining an estimated variance of noise for the model of BHA dynamics;
      determining variances of predicted azimuth measurements and predicted inclination measurements for the wellbore trajectory, based on the estimated variance of noise; and
      determining a weighted combination of the variances of predicted azimuth measurements and predicted inclination measurements for the wellbore trajectory;
   determining a control input for the BHA that reduces the uncertainty of the predicted wellbore trajectory; and
   drilling the wellbore according to the determined control input for the BHA.

* * * * *